Oct. 30, 1945.　　　　J. E. HARVLIE　　　　2,387,729
CABLE ELBOW
Filed Nov. 1, 1943
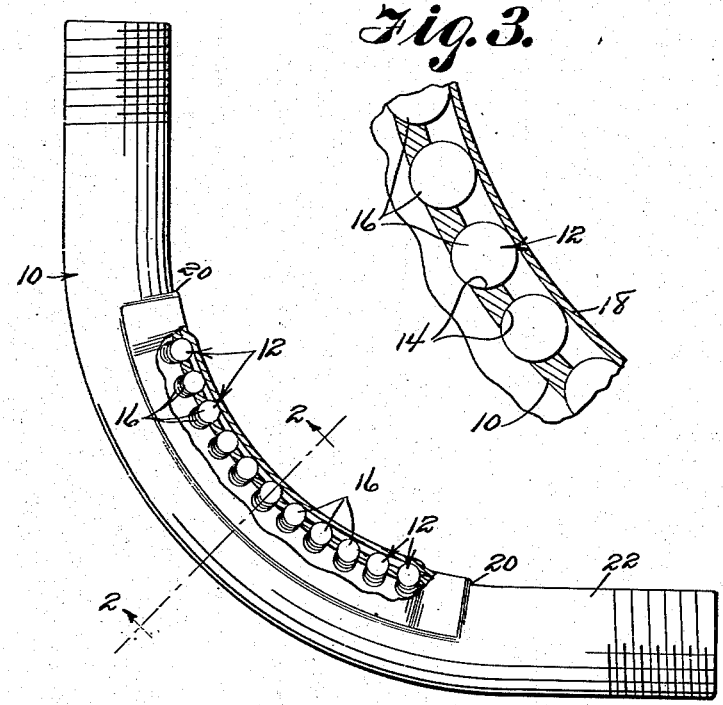
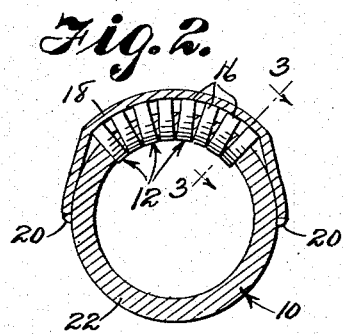
Joseph E. Harvlie　INVENTOR.
BY
Victor J. Evans & Co.
ATTORNEYS Patented Oct. 30, 1945

2,387,729

UNITED STATES PATENT OFFICE 2,387,729

CABLE ELBOW

Joseph E. Harvlie, Tacoma, Wash.

Application November 1, 1943, Serial No. 508,541

2 Claims. (Cl. 138—47)

My invention relates to electric circuit cables and the like, and has among its objects and advantages the provision of an improved conduit elbow so designed as to facilitate movement of the cable through the bend.

In the accompanying drawing:

Figure 1 is a side view of the elbow.

Figure 2 is an enlarged sectional view along the line 2—2 of Figure 1, and

Figure 3 is an enlarged sectional view along the line 3—3 of Figure 2.

In the embodiment of the invention selected for illustration, Figure 1 illustrates an elbow 10 within which are incorporated roller gangs 12. These gangs are arranged transversely of the elbow and are spaced longitudinally one from the other along the smaller diameter side of the elbow. The rollers in the respective gangs are arranged face to face circumferentially of the elbow but are arranged radially individually with respect to the axis of the elbow.

In Figures 2 and 3 the elbow 10 is cut out at 14 to provide bearing faces for the roller elements 16 of the gangs 12. The roller elements 16 are in the nature of disks and are so arranged as to project a margin of their peripheral faces inside the elbow 10 to be engaged by the cable pulled therethrough.

With the roller gangs in position, a cover plate 18 is placed over the rollers and welded at 20 to the elbow or conduit 22 to hold the rollers in position. At the same time, the cover 18 encloses the rollers as to provide a fluid tight protection to the end that the elbow or conduit may be incorporated in concrete structures.

In Figure 2, the inner peripheral edge margins of the rollers 16 are positioned in close relationship. Thus the cable pulled through the elbow will bear against a series of roller gangs, with the rollers guided for movement so as to permit the cables to be easily pulled around sharp bends.

Without further elaboration, the foregoing will so fully explain my invention, that others may, by applying current knowledge, readily adapt the same for use under various conditions of service.

I claim:

1. A cable housing elbow having slots therein, said slots being shaped to provide bearing faces and extending circumferentially of the elbow, roller elements having bearing engagement with the walls of said slots and projecting partly inside the elbow to be engaged by a cable pulled therethrough, and a cover means attached to the outside of the elbow for holding said roller elements in position and to enclose the roller elements.

2. In a cable elbow, roller elements mounted on the smaller diameter of the curvature of the elbow, and projecting partly inside the same to be engaged by the cable pulled therethrough, said roller elements being arranged in gangs spaced longitudinally of the elbow, with the roller elements in the respective gangs arranged face to face and spaced circumferentially of the elbow, and an outside enclosure for said roller elements.

JOSEPH E. HARVLIE.